US010959135B2

(12) United States Patent
Waldhauser et al.

(10) Patent No.: US 10,959,135 B2
(45) Date of Patent: Mar. 23, 2021

(54) IMPROVING HANDOVER TIME

(71) Applicant: NOKIA SOLUTIONS AND NETWORKS OY, Espoo (FI)

(72) Inventors: Richard Waldhauser, Munich (DE); Hanns Jurgen Schwarzbauer, Groebenzell (DE); Bernhard Raaf, Neuried (DE); Juergen Michel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 106 days.

(21) Appl. No.: 14/651,153

(22) PCT Filed: Dec. 14, 2012

(86) PCT No.: PCT/EP2012/075521
§ 371 (c)(1),
(2) Date: Jun. 10, 2015

(87) PCT Pub. No.: WO2014/090326
PCT Pub. Date: Jun. 19, 2014

(65) Prior Publication Data
US 2015/0334609 A1 Nov. 19, 2015

(51) Int. Cl.
*H04W 36/00* (2009.01)
*H04W 12/00* (2009.01)
*H04W 74/00* (2009.01)

(52) U.S. Cl.
CPC ... *H04W 36/0061* (2013.01); *H04W 36/0009* (2018.08); *H04W 12/0052* (2019.01); *H04W 74/006* (2013.01)

(58) Field of Classification Search
CPC ............. H04W 36/00; H04W 36/0083; H04W 36/0005; H04W 36/08; H04W 36/0055;
(Continued)

(56) References Cited

U.S. PATENT DOCUMENTS

2008/0069060 A1* 3/2008 Das .................. H04L 5/023
370/337
2011/0047029 A1 2/2011 Nair et al.
(Continued)

FOREIGN PATENT DOCUMENTS

CN          101911785 A    12/2010
WO      2009/064932 A2     5/2009
WO      2014/067567 A1     5/2014

OTHER PUBLICATIONS

International Search Report and Written Opinion for International Application No. PCT/EP2012/075521, dated Sep. 13, 2013, 11 pages.
(Continued)

*Primary Examiner* — Erica Navar
(74) *Attorney, Agent, or Firm* — Brake Hughes Bellermann LLP

(57) ABSTRACT

Example implementations relate to devices, methods, and computer program products of communication networks in relation to, e.g., involved in initial access from an idle status, connection reestablishment, handover, or synchronization. A terminal apparatus may include: a control module configured to detect receipt of a group information indicative of a group of at least two network apparatuses, the group information being descriptive for a certain configuration of communication parameters enabling the terminal apparatus to communicate with anyone of the network apparatuses of the respective group, and request connecting to at least one of the network apparatuses of the group by use of the certain configuration.

12 Claims, 9 Drawing Sheets

(58) Field of Classification Search
CPC ............. H04W 36/0072; H04W 36/06; H04W 36/0016; H04W 84/045; H04W 72/042; H04W 76/002; H04W 74/006
USPC ................................................ 455/436–444
See application file for complete search history.

(56) References Cited

U.S. PATENT DOCUMENTS

| | | | |
|---|---|---|---|
| 2011/0171915 A1* | 7/2011 | Gomes .................. | H04W 24/10 455/73 |
| 2013/0122899 A1* | 5/2013 | Panpaliya ......... | H04W 36/0072 455/432.1 |

OTHER PUBLICATIONS

First Office Action for Chinese Application 201280078182.3, dated Dec. 5, 2017, 3 pages.
Office Action for European Application No. 1280878202, dated Jun. 6, 2018, 8 pages.

* cited by examiner

IMPROVING HANDOVER TIME

This application is a national stage entry of PCT Application No. PCT/EP2012/075521, filed on Dec. 14, 2012, entitled "IMPROVING HANDOVER TIME", which is hereby incorporated by reference in its entirety.

FIELD OF THE INVENTION

The present invention relates to devices, methods and computer program products in relation to mobile communication such as 3GPP Long-Term Evolution Advanced (LTE-A) or future systems called Beyond 4G (B4G) or 5G and applies to future B4G and 5G user equipment (UE) centric handover procedures. In particular, it relates to those devices, methods, and computer program products of communication networks in relation to e. g. involved in initial access from an idle status, connection reestablishment, handover, or synchronization.

BACKGROUND

The conventional network provides LTE and LTE-A UE handover so that the handover preparation and execution phase is network centric. Consequently, the decision to execute a handover is done by the network which might configure specific criteria.

In the first LTE version (Rel-8), attention is drawn to the design of a highly efficient handover functionality, which basically means as quickly as possible and also as simple as possible. The requirement for the execution of an intra- or inter-frequency handover to a known cell, i. e. the interruption time from the moment when the handover is commanded until the first available Physical Random Access Channel (PRACH) occasion in the new cell, shall be less than 50 ms. In the interruption requirement, a cell is regarded to be known by the UE if it meets the relevant cell identification requirement during the last 5 seconds. Otherwise the cell is unknown to the UE. If the UE has to handover to an unknown cell, then the handover interruption time will be 130 ms, e. g. 50 ms plus 80 ms for searching the unknown cell.

Hence, it is an object of the invention to improve such systems.

SUMMARY

According to a first (e. g. terminal apparatus-related) aspect of the invention, there is provided a terminal apparatus, comprising: a control module configured to detect receipt of a group information indicative of a group of at least two network apparatuses, the group information being descriptive for a certain configuration of communication parameters enabling the terminal apparatus to communicate with anyone of the network apparatuses of the respective group, and request connecting to at least one of the network apparatuses of the group by use of the certain configuration.

According to a second (e. g. network apparatus-related) aspect of the invention, there is provided a network apparatus, comprising: a control module configured to detect receipt of a connection request transmitted by a terminal apparatus using a certain configuration which is adapted to connect the terminal apparatus to any network apparatus of a group of at least two network apparatuses, which group is indicated by a respective group information being descriptive for the certain configuration, and, if the certain configuration used by the terminal apparatus is applicable for the network apparatus, permit the terminal apparatus to connect and use the certain configuration for communicating.

According to a third (e. g. terminal method-related) aspect, a method for operating a terminal apparatus, comprising: detecting receipt of a group information indicative of a group of at least two network apparatuses, the group information being descriptive for a certain configuration of communication parameters enabling the terminal apparatus to communicate with anyone of the network apparatuses of the respective group, and requesting connecting to at least one of the network apparatuses of the group by use of the certain configuration.

According to a fourth (e. g. network method-related) aspect, a method for operating a network apparatus, comprising: detecting receipt of a connection request transmitted by a terminal apparatus using a certain configuration which is adapted to connect the terminal apparatus to any network apparatus of a group of at least two network apparatuses, which group is indicated by a respective group information being descriptive for the certain configuration, and, if the certain configuration used by the terminal apparatus is applicable for the network apparatus, permitting the terminal apparatus to connect and use the certain configuration for communicating.

According to a fifth aspect of the present invention, there are provided one or more computer program product(s) comprising computer-executable components which, when the program is run on a computer, are configured to carry out the respective method(s) as referred herein above.

The above computer program product may further comprise computer-executable components which, when the program is run on a computer, perform the method aspects mentioned above in connection with the method aspects.

The above computer program product/products may be embodied as a computer-readable storage medium.

Various further aspects of at least some exemplary embodiments of the aspects of the invention are set out in the respective dependent claims.

DESCRIPTION OF EMBODIMENTS

Currently, in e. g. LTE and LTE-A architecture, 3GPP is using a network controlled handover which consists of a preparation phase, an execution phase, and a completion phase.

During the preparation phase, the nodes exchange context information used to admit and reserve resources at the target side for the radio bearers, to establish the forwarding tunnel if needed, the user plane (UP) tunnel address for uplink direction and information for the UE that allows for quick and smooth attachment to the target cell, e. g. a contention free Random Access Channel (RACH) access.

While the preparation phase consists of exchanging two messages between the involved source and target nodes such as E-UTRAN NodeB (eNB), the execution phase needs one additional message between source and target eNB if Packet Data Convergence Protocol (PDCP) status preservation is needed for any of the bearers, e. g. a radio link control acknowledged mode bearer (RLC_AM).

Moreover, there may be two messages involving the UE:

First, from the source eNB to the UE, a handover command message which in fact is a Radio Resource Control (RRC) connection reconfiguration message containing mobility control information and the configuration of the resources to be used on the target side, e. g. a new Cell Radio Network Temporary Identifier (C-RNTI), which may represent an identifier for a UE that is unique within the serving cell, target eNB security algorithm identifiers for the selected security algorithms, may include a dedicated RACH preamble, and possibly some other parameters, namely, access parameters, System Information Blocks (SIB), etc.

Second, a RRC connection reconfiguration complete message from the UE to the target eNB.

Typically, the completion phase serves to perform the path switch at the Evolved Packet Core (EPC) for the downlink direction and to release resources that are no longer needed at the source side node or nodes. The completion phase could also be needed for a final stabilization of the handover, e. g. if the path switch was performed only partially by the EPC.

Compared with a S1 handover, using a X2-based handover results in fewer messages to be exchanged between the EPC and the eNB. Also, if a X2 interface is present, some cell specific configuration information can be exchanged between eNBs which is useful in case of handovers such as e. g. the number of antenna ports, the PRACH configurations, Multimedia Broadcast Multicast Service (MBMS) Single Frequency Network (MBSFN) subframe information, the Closed Subscriber Group Identifications (CSG-ID), and the like.

The handover is controlled by the network. Typically, after receiving a measurement report, the eNB decides about the most reasonable target cell or cells for the handover. The measurements are typically configured by the eNB beforehand. However, the source eNB can also perform a so called 'blind' handover which means without considering measurements reports.

If a handover fails, the UE can try a connection re-establishment at an eNB providing best radio conditions at that moment. However, re-establishment only works for cells where a corresponding UE context is available. This will be the case for the source eNB, for the target cell of the target eNB and, if corresponding additional re-establishment information was provided to the target eNB by the source eNB, it also works for additional cells of the target eNB.

For X2 based handover, the source eNB can be allowed to prepare target cells in more than one neighbor eNB, but for the handover execution only one out of these candidates is to be selected by the source eNB.

If re-establishment does not succeed, the connection will be newly established in the Radio Access Network (RAN) including security procedures, which takes some more time. The connection from EPC point of view is still alive but information will be updated after receiving a signaling recovery from the RAN.

Generally, a communication between at least two parties that communicate with each other or intend to communicate with each other, such as e. g. stations, terminals, participants of a communication network, or the like, requires a communication connection or communication link, respectively, connecting the communicating parties with each other. Preferably, the communication connection is established after an attach is provided of one of the participants to another one of the participants so that the communication connection is the result of the attach.

According to an exemplary embodiment of the invention, the terminal apparatus, e. g. a UE, is informed efficiently about the configuration of multiple network apparatuses, e. g. eNBs, which may be potential targets for a UE handover. Information is introduced and provided to the UE characterizing a group of cells, or eNBs, respectively, where a certain configuration, e. g. a certain minimum configuration, known to the UE, can be used for connecting to new target cells or eNBs, respectively. This certain configuration is preferably sufficient to allow e.g. a UE centric handover and attach to the new cell by utilizing a reduced handover preparation phase. Preferably, the handover preparation phase consists of a single cell change indication message as a change message only such that the UE may be allowed to move within this group of cells without explicit control of the UE's mobility by the serving eNB. The new information can, for example, be a list of cell-IDs and/or eNB-IDs or a mobility group ID (MG-ID) representing a group of cells and/or eNBs where the same certain configuration can be used. Such a group of cells or eNBs, respectively, is in the following also referred to as mobility group (MG).

According to an exemplary embodiment, there is provided a terminal apparatus, comprising: a control module configured to detect receipt of a group information indicative of a group of at least two network apparatuses, the group information being descriptive for a certain configuration of communication parameters enabling the terminal apparatus to communicate with anyone of the network apparatuses of the respective group, and request connecting to at least one of the network apparatuses of the group by use of the certain configuration. Detecting receipt includes detecting the group information in a message received, identifying the group information in a memory connected with the apparatus, or the like.

In a further embodiment, the control module is further configured to request connecting by transmitting an attach request including the group information to any one of the at least two network apparatuses by using the certain configuration. So, the group information can be transmitted to the network apparatus directly with the attach request. The group information may be provided in the attach request as an attach request control element.

Yet a further embodiment teaches that the control module is further configured to request connecting by transmitting a message including the group information upon receipt of a response of the respective network apparatus. The message may be a first message transmitted after attach, or it may be any other message. The group information may be provided in the first or any other message as an information element. The message may be provided in addition to an attach request which may already include the group information. The group can be a mobility group MG as outlined above. The message can be a change message as described below. The second option further allows providing the network apparatus with information that the terminal apparatus is adapted to autonomous handover at any time, e. g. during a connected status or the like.

The terminal apparatus can be a portion of a terminal or represent the terminal or the user equipment UE, respectively. The terminal apparatus can be the user equipment. The control module may be integral with the terminal apparatus or it may be established by a hardware circuitry, a computer running a program or the like. The terminal apparatus may be a hardware circuitry, a computer running a program, combinations thereof, or the like. So, the terminal apparatus may also be provided by a chip such as a semiconductor chip which may form a component of a user equipment (UE) such as a mobile phone, a sensor equipment or the like, or it may be integral therewith.

The group information can be an information element that may be a new element or that can be included in existing elements. The group information can be indicative of a group of network apparatuses that can be accessed by the terminal apparatus using same certain configuration. The group information can be a mobility group-ID (MG-ID) that can be allocated to the network apparatuses being members of the group. Alternatively, a group information can be a list of cell identifications and/or identifications of network apparatuses that are members of the group. A certain configuration can be allocated to the group information which allows the terminal apparatus to be quickly connected to, preferably any, network apparatus that is a member of the group. The network apparatus can be a network element of e. g. a network entity, preferably, a wireless communication network such as an eNB, a cell, combinations thereof, or the like.

The attach request can be signaling in order to provide attachment of the terminal apparatus to the network apparatus. E. g., the attach request can comprise a PRACH procedure so as to synchronize with the cell and provide, for instance, a first connection to the network apparatus. So, a random access Preamble can be included in the PRACH procedure that, in turn, may include the MG-ID and the terminal apparatus identification. It may also include the network apparatus identification which is indicative for the network apparatus where the terminal apparatus was last re-configured to use a configuration different from any certain configuration. The MG-ID, the terminal apparatus ID and the network apparatus ID may also be part of a first RRC message sent to the network apparatus after successful completion of a PRACH procedure, e.g. by an Attach message or a Handover Complete message.

According to a further exemplary embodiment, the control module is further configured to detect a handover condition and perform handovers to another network apparatus being a member of the group autonomously, i.e. without the need of being commanded by the serving network apparatus. In order to perform an autonomous handover the control module causes to select another one of the at least two network apparatuses of the group for establishing a communication link by informing the serving network apparatus about the handover, the target network apparatus identification and target cell identification, e.g. by sending a Cell Change Indication. The terminal apparatus also is transmitting the attach request to the selected network apparatus. The handover condition may be provided e. g. by reception parameters of a transceiver of the terminal apparatus or the like. Selection can be caused by Quality of Service (QoS) information, channel capacity, or the like. Based thereon, the control module can be configured to cause an autonomous handover from a first one to a second one of the at least two network apparatuses by transmitting a cell change indication message to the serving network apparatus. Especially, the control module of the terminal apparatus is configured to detect a handover condition, cause an autonomous handover to the other network apparatus by causing to select a another one of the at least two network apparatuses of the group for establishing a communication link by transmitting a request or a message including the group information to the other network apparatus, and, upon receipt of a response of the other network apparatus, transmitting a change message including the group information. Preferably, the message is a handover-related message which may indicate to the other apparatus that a handover using the certain configuration is prepared.

Upon receiving a change message, e. g. a cell change indication message, from the terminal apparatus indicating an autonomous handover to another cell of at least another network apparatus of the group, the control module of the serving network apparatus informs the control module of the indicated target network apparatus about the terminal apparatus being about to handover to the target network apparatus by sending e. g. a Handover Indication message. Moreover, the control module of the serving network apparatus is further configured to cause the Handover Indication message as a change message to include individual configuration information of the terminal apparatus. The individual configuration information can contain the MG-ID and terminal apparatus ID of the terminal apparatus, the UE context available for this terminal apparatus or the like to enable the network apparatus to proceed connecting without substantial time loss. The UE context can comprise network-related parameters which may be necessary to e. g. adjust network-related components to establish and/or optimize the communication connection to the terminal. The change message can be any message containing the group information such as an attach request, a Handover command, a subsequent first message after attach, or the like.

According to an exemplary embodiment, the control module is further configured to cause receipt of the group information via at least one of an individual message channel allocated to the terminal or listening to a broadcast channel. If the terminal apparatus is e. g. already connected to one of the network apparatuses of the group, the network apparatus may provide the group information simply via a dedicated UE individual message channel. If the terminal apparatus e. g. is disconnected, it may listen to broadcast signals by preferably using a transceiver. A received broadcast signal may be analyzed by the terminal apparatus upon containing a group information.

Yet an exemplary embodiment teaches that the control module is further configured to cause reconfiguration of terminal-related communication parameters upon receipt of a re-configuration message from the network apparatus. So, the communication link established at the certain configuration can be enhanced, especially, to provide full communication service to the terminal apparatus.

A further exemplary embodiment teaches that the control module is configured to detect validity information in the group information indicating validity of the group information, determine validity of the group information, and discard the group information if invalid. The validity information can be a signature, time information, combinations thereof, or the like. In case of a time information, this can be also used for providing consistency of the group information, especially, when changes to the group information are to be provided.

According to another exemplary embodiment, the control module is further configured to provide individual configuration information by negotiating with the network apparatus. A respective procedure can be provided so that communication-related configurations, parameters, data, or the like can be optimized in order to further enhance the communication service.

Yet another embodiment provides the control module being configured to detect receipt of the group information by listening to at least two network apparatuses. This allows the terminal apparatus to receive the group information at least partially from different network apparatuses which can provide an advantage e. g. in the event of poor reception conditions connected with partial data loss. Preferably, the terminal apparatus is configured to construe a complete group information from received group information portions of the different network apparatuses belonging to the respective group.

According to an exemplary embodiment of the invention, a network apparatus is provided, comprising: a control module configured to determine receipt of an attach request or a message of a terminal apparatus, detect group information in the attach request or the message, respectively, which group information is indicative of a respective group of at least two network apparatuses, the group information being descriptive for a certain configuration which is adapted to connect the terminal apparatus to anyone of the network apparatuses of the group, compare the detected group information with an own group information of the network apparatus, and, if the detected group information corresponds to the own group information of the network apparatus, permit the terminal to connect and use the certain configuration for communicating. Transmission of the message may be caused by the terminal apparatus at any time, especially, it can be broadcast. The message can be an information element included in signaling messages or the like. The permission to connect includes the permission to attach. It may further include the permission to autonomous handover.

The network apparatus can be an element of a network entity, such as e. g. a eNB, a HeNB, a cell, combinations thereof, or the like. The other apparatus can be a terminal apparatus, such as an UE. The control module can detect receipt of an attach request of the terminal apparatus, such as a user equipment (UE), by controlling a transceiver. A detector that may be integral with the control module or the network apparatus can detect a group information, which may be a group-ID, other respective information/identification, or the like. An own group information of the apparatus may be stored in a memory module of the network apparatus. Both, received and stored group informations can be compared by a comparator of the network apparatus. If both group informations are identical, the network apparatus can connect the terminal apparatus by using a certain configuration allocated to the group information. So, the UE can e. g. be connected fast and reliable by the network apparatus. Receipt of the attach request can be provided by a transceiver being communicatively linked to the network apparatus, especially, the control module of the network apparatus.

Moreover, the control module can be further configured to allow the terminal apparatus an autonomous handover to network apparatuses of the group upon receipt of an attach request as a certain type of a change message containing the group information. So, the terminal apparatus may decide handover, preferably, by using the change message.

In a further exemplary embodiment, the control module retrieves context information about the terminal apparatus from any network apparatus, which is indicated by the network apparatus identification received in the attach request or a message received after successful attach request, or which the terminal communicate with before the attach, or a source network apparatus to which the terminal has been initially attached, and/or which the terminal communicated with before the attach, e.g. by using a Context Request procedure. This can be achieved by providing a communication link via an interface to the previous and/or source network apparatus. In the case of wireless communication, the interface can be a S1-interface, a X2-interface, or the like.

Furthermore, the control module can be configured to transmit a reconfiguration message to the terminal apparatus, the reconfiguration message comprising terminal-related and, preferably, network-related communication parameters. This allows adapting communication-related parameters in order to enhance the communication service.

According to another embodiment of the invention, the control module can cause broadcasting the group information. This allows supplying terminal apparatuses (UEs) with the group information, preferably, independent from their connection status.

Moreover, the control module can be further configured to cause broadcasting the group information, preferably, depending on the network apparatuses of the group.

According to another exemplary embodiment, the control modules are configured to broadcast both group information and the associated certain configuration. Also instead of only broadcasting group information and associated certain configuration only for the serving cell, the control modules can be configured to broadcast also the group information and associated certain configuration for the cells belonging to the neighborhood of the serving cell. This means that adjacent cells broadcast the same information as the serving cell. Ideally, this can be organized in a staggered way so as to avoid e. g. overlapping of broadcasting the same information within the neighborhood of the serving cell. If the network apparatuses also broadcast the time schedule when each cell broadcasts these informations, the terminal apparatus can select the broadcast of the cell which is next in time to broadcast these informations. Moreover, this has the advantage that terminal apparatuses can obtain the information earlier, or that the time intervals for broadcasting can be increased, or both.

Another exemplary embodiment teaches that the control module is configured to cause to transmit the group information to the terminal apparatus via an individual message channel. So, a connected terminal apparatus can be selectively provided with the group information. This can also be combined with broadcasting the group information.

According to one embodiment, the ordinary broadcast of the network apparatus is used to broadcast the group information. In a further embodiment broadcast is enhanced with a so called new 'area broadcast' where the certain configuration that is common for a mobility group is broadcast instead of using individual dedicated message channels to inform the individual UEs of the certain configuration. Different certain configurations using dedicated message channels can be configured, e. g. in order to support different MG-IDs with related different certain configurations to be allowed within one Mobility Group.

In order to avoid overburden the area broadcast enhancement, additional rules are introduced according to a further embodiment of the invention. One rule can, for example, divide the range of assigned UE-IDs, whereby the different ranges indicate using different DRX muting patterns. Another embodiment teaches to make certain configurations dependent on certain UE capabilities meaning that either both the certain configuration and the corresponding UE capability are broadcast. The UE knows its capabilities and can deduce which certain configuration matches, or the UE simply ignores configurations that it does not understand.

Another embodiment of broadcasting not only MG-IDs for the own MG is that the new area broadcast also informs about the certain configuration(s) of other mobility groups. Preferably, the information for all neighbor mobility groups is sent, wherein e. g. the MG-ID(s) and the corresponding certain configurations are broadcast together, so as to let the UE know the exact relation between a MG-ID and the corresponding certain configuration. According to another embodiment, at least some rules must enable that the UE can assign the broadcast certain configuration to the right MG-ID. This enables the UEs by listening to the area broadcast of the serving cell to learn also the certain configuration(s) for the at least neighboring mobility groups.

When the UEs can also receive the broadcast channels of the neighbor cells, this can be used to reduce the amount of data that needs to be broadcast per cell during a broadcast transmission period by a smartly organization of the broadcast channels among the different cells that can be simultaneously received by the UE(s). So, little information needs to be broadcast during every transmission period of the area broadcast by every cell. For example, not every cell needs to broadcast the configuration for all MGs in every transmission period of the area broadcast as long as this information is provided by one of the receivable neighbor cell area broadcasts. This requires broadcasting the time table in a easy accessible part of the broadcast resulting in reading more often than other parts so that the UEs know which cell's area broadcast they have to listen at a certain point in time to get the information for a certain mobility group, i. e. certain MG-IDs and the associated configuration to be used there. Consequently, one exemplary embodiment teaches that the control module of the terminal apparatus is configured to detect receipt of the group information by listening to at least two network apparatuses. This allows providing some redundancy in view of detecting the group information, and e. g. the certain configuration if applicable.

In a further embodiment, the new area broadcast is organized differently to transmit in a staggered way but transmits in SFN fashion, so UEs in bad radio conditions can benefit, if they can receive the new area broadcast simultaneously from different cells, because this allows joint reception, i. e. to combine the information of the badly received broadcast signals from the different cells to extract a reliable information.

In a further exemplary embodiment, the control module is further configured to cause, upon detection of the group information, to handover the terminal apparatus from a previous or source network apparatus of the group of network apparatuses to the network apparatus such as a target network apparatus. A new communication link to the terminal apparatus is established. The communication link to the previous or source network apparatus can be canceled.

Yet another exemplary embodiment teaches that the control module is further configured to receive individual configuration information from the terminal apparatus. This allows the network apparatus adapting communication-related parameters in order to enhance the communication service provided to the terminal apparatus. The individual configuration information can be received via an individual communication link to the terminal apparatus.

According to an exemplary embodiment, the control module is configured to derive individual configuration information of the terminal apparatus by negotiating with the terminal apparatus. The network apparatus can provide negotiating and/or configuring after the terminal apparatus having already been connected.

A further exemplary embodiment teaches that the control module is further configured to provide the group information with validity information indicating validity of the group information. This allows providing for consistency, e. g. when some group information is to be changed or the like. Such configuration can be augmented by a timer indicating a validity time of a corresponding configuration.

In one exemplary embodiment, the new information, namely the group information, can be made available to the UEs using dedicated UE individual message channels or by listening to a broadcast channel.

The certain configuration of a mobility group can be configured for each small cell and be made available to the UEs using at least one dedicated UE individual message channel.

More than one mobility group ID and related certain configurations can be used within one mobility group. This means a list of MG-IDs may be broadcast by all cells.

In a further embodiment, the certain information may include corresponding information for other mobility groups that may have different parameters but are in the same neighborhood.

Moreover, the UE may receive this configuration by listening to a new area broadcast channel which provides the information for accessing the cells of this mobility group.

According to an exemplary embodiment, the UE individual configuration information such as e. g. parameters that are not common to all UEs of the mobility group can either be derived implicitly from a unique UE ID, e. g. from a C-RNTI or an International Mobile Subscription Identity (IMSI), or may be negotiated and/or configured during the synchronization procedure, during the call setup or during handover.

Another exemplary embodiment teaches that configuration information concerning a group of nodes or cells, respectively, as network apparatuses can be conveyed rather than an individual node. Hence, the total amount of information that needs to be transferred towards a terminal apparatus such as the UE can be reduced considerably. This in turn allows the UE to be prepared for a handover with a multitude of nodes without excessive requirements on transferring or storing associated information.

According to an exemplary embodiment, the configuration of a set of cells can be linked to a group ID. Consequently, when a UE connects, e. g. by an attach or a handover, to a cell of the same group ID the UE knows essential information of the cell and can skip reading BCCH information such as for cell reselection, can do a handover without or with less information in the RRC reconfiguration message, or even do a UE initiated handover or a call reestablishment quickly and with less signaling overhead.

BRIEF DESCRIPTION OF THE DRAWINGS

The teachings of the present invention can be readily understood and at least some additional specific details will appear by considering the following detailed description of at least some exemplary embodiments in conjunction with the accompanying drawings, in which.

DETAILED DESCRIPTION OF THE EMBODIMENTS

Without limiting the scope of the invention to the embodiments, the invention is illustrated in more detail by the following description referring to the accompanying drawings.

References to certain standards, media, and/or resources in this description are rather supposed to be exemplary for the purpose of illustration of the invention in order to improve the ease of understanding of the invention. They are not to be understood as limiting the inventive concept. Likewise, the language as well as terms used herein such as e. g. signal names, device names and the like are to demonstrate the embodiments only. Use of such language or terms apart from their understanding according to this disclosure shall not be applied to the invention for the purpose of limiting its scope.

Generally, user equipments (UE) may be mobile devices such as cellular phones, smart phones, laptop's, handhelds, tablets, vehicles, or the like.

Although wireless communication is usually established via radio as a medium, it may also be applied to ultrasonic, light, especially, e. g. infrared light, or the like as medium for the purpose of transmission. The transmission may be provided by a communication link such as an uplink (UL) or downlink (DL).

Herein below, however, exemplary aspects of the invention will be described with reference to radio communication as wireless communication medium, especially, referring to mobile communication such as provided by GSM, UMTS, LTE, or the like.

Figure 1:
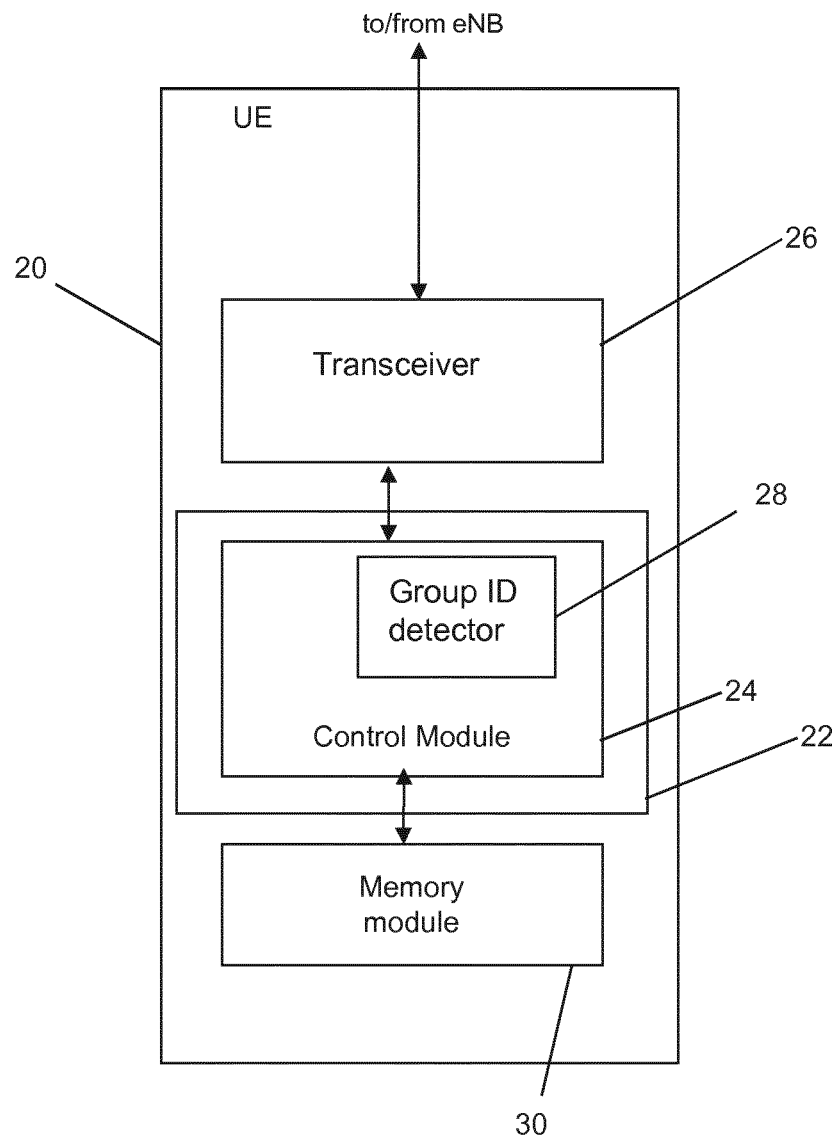
FIG. 1 schematically shows an exemplary embodiment of a user equipment (UE) provided with an apparatus according to the invention.

FIG. 1 depicts schematically in an exemplary embodiment a user equipment (UE) 20 having an apparatus 22 as a terminal apparatus. The apparatus 22 comprises a control module 24 that, in turn, has a group-ID detector 28. The group-ID detector 28 is configured to detect receipt of a group-ID as a group information indicative of a group of at least two network apparatuses 12 of a communication network, the group-ID characterizing a certain configuration which can be used for connecting to anyone of the network apparatuses 12. In this embodiment, the group information is established by a group identification, (group-ID). The control module 24 is in communication connection with a transceiver 26 that can establish a radio based communication link to a network apparatus 12 of a wireless communication network. The transceiver 26 is contained by the UE 20. It may also be integral with the apparatus 22. Moreover, the apparatus 22, in this embodiment the control module 24, is in communication connection with a memory module 30. In the memory module 30, certain data can be stored that is necessary for establishing a communication link to any one of the other apparatuses 12. Especially, the memory module 30 can store the group-ID and its related configuration as well as some additional data related to context information, UE identification (UE-ID), group-IDs of neighboring groups, or the like. The control module 24 may cause transmitting a single request including the group information to at least a first one of the at least two network apparatuses, and, upon receipt of a response of the first network apparatus 12, establish a communication link to the first network apparatus 12.

Figure 8:
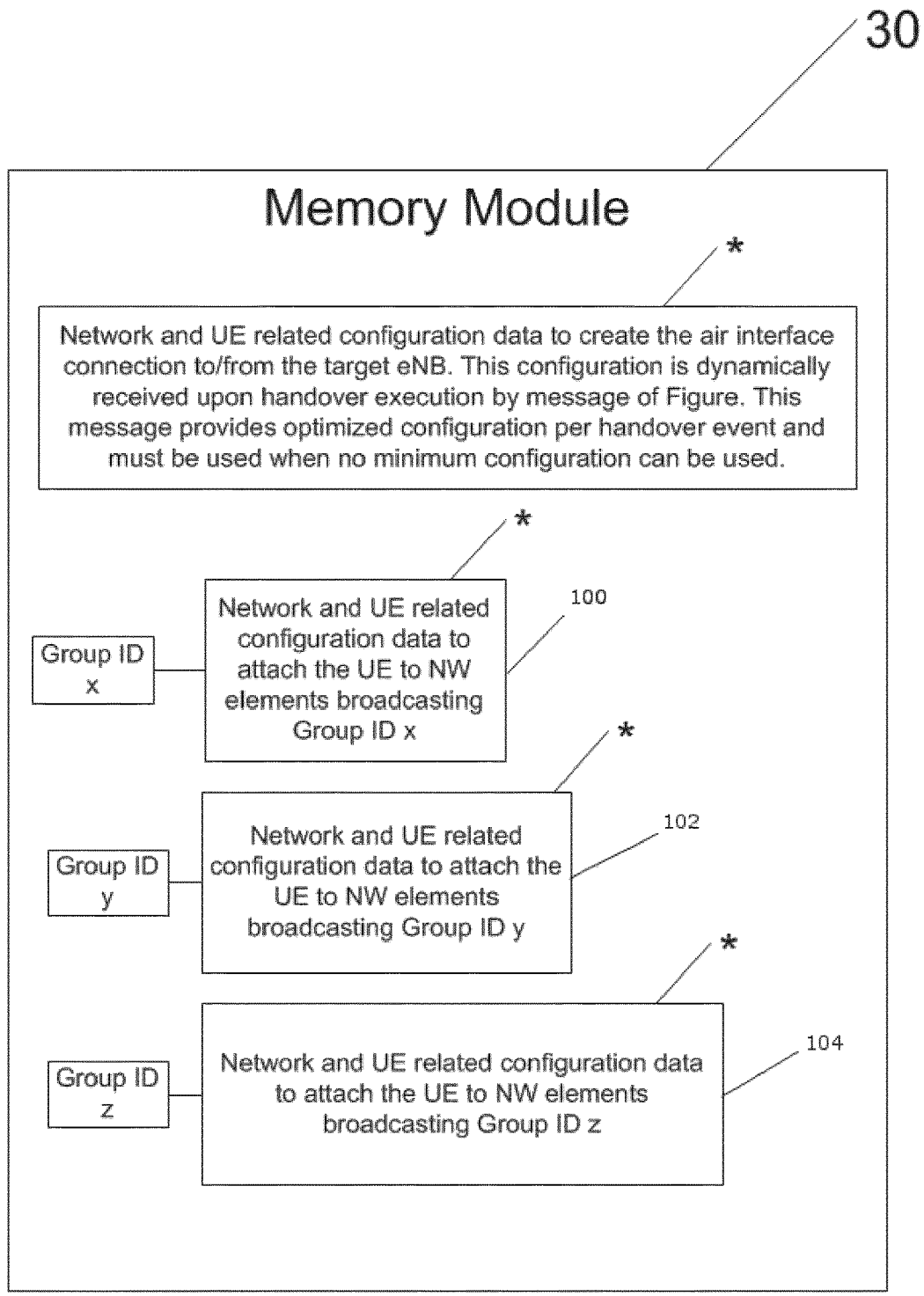
FIG. 8 schematically shows an exemplary embodiment of a memory module according to an exemplary embodiment of the invention.

An embodiment of the memory module 30 is depicted in FIG. 8. The memory module 30 comprises a storage component such as a random access memory, read only memory e. g. if some configurations are not variable but predetermined, combinations thereof, or the like. The memory module 30 contains network and UE related data in order to allow creating the air interface connection, as a wireless connection, to/from the target eNB as a network apparatus. This configuration is preferably dynamically received upon handover execution by message of FIG. 9. This message provides optimized configuration per handover event and is preferably used when no minimum configuration is applicable.

As also indicated in FIG. 8, the memory module 30 stores data related to different groupIDs. A storage area 100 stores network-related and UE-related configuration data for a respective group x, which data is necessary to attach the UE to the network elements broadcasting group-ID x.

A storage area 102 stores network-related and UE-related configuration data for a respective group y, which data is necessary to attach the UE to the network elements broadcasting group-ID y. Moreover, a storage area 104 stores network-related and UE-related configuration data for a respective group z, which data is necessary to attach the UE to the network elements broadcasting group-ID z.

The size of the boxes indicating the group-id-related data is further indicative for the amount of data that is needed to create a connection according to the minimum configuration that is related to a specific group-ID.

Figure 2:
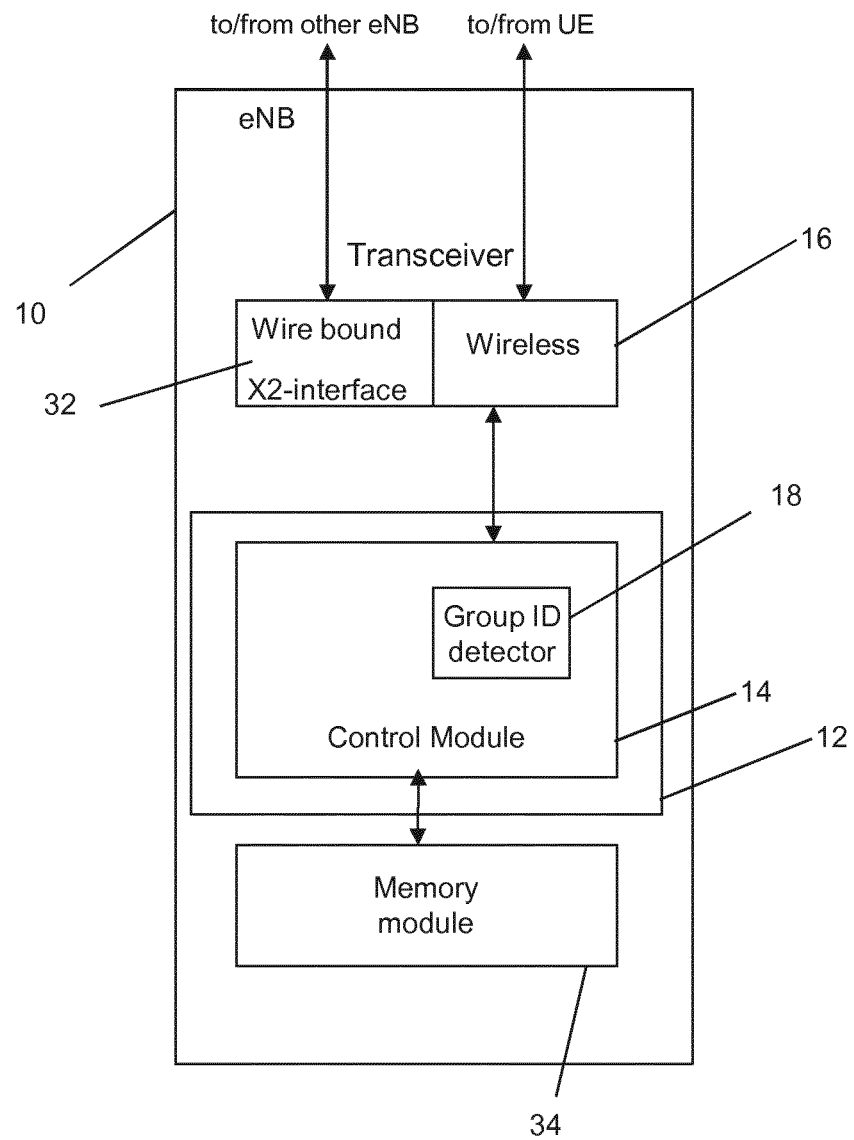
FIG. 2 schematically shows an exemplary embodiment of an eNB as an exemplary embodiment of a network element provided with an apparatus according to the invention.

FIG. 2 shows schematically in an exemplary embodiment of the invention a network apparatus 12 such as being included by an eNB 10. The eNB 10 comprises the network apparatus 12 including a control module 14. The control module 14 has a group identification (group-ID) detector 18 that is capable of detecting a group information in messages or signals received by a transceiver 16 of the eNB 10 via its wireless channel that is provided for communication to/from UE 20. Therefore, the network apparatus 12, especially the control module 14, is in communication connection with the transceiver 16.

Moreover, the apparatus 12, especially the control module 14, is in communication connection with a memory module 34 which can store data, preferably the group-ID and its related configuration. The network apparatus 12 belongs to a group of network apparatuses that have the same group-ID. The network apparatuses of the group may be similar as the network apparatus 12 or deviating thereof but able to establish a communication link to the terminal apparatus 22 upon receipt of the group-ID from the terminal apparatus 22.

The memory module 34 may also store context information related to UEs connected. Moreover, the network apparatus 12, especially the control module 14, is further in communication connection with an interface 32 of the transceiver 16 adapted to communication wire-bound with other network apparatuses, especially, those of the group which the network apparatus 12 belongs to. So, communication with further apparatuses of the network is allowed. Presently, the interface 32 is configured to provide an X2 communication link according to the LTE standard. However, it may be configured to provide a S1 communication link, a communication according to another protocol, combinations thereof, or the like.

According to an exemplary embodiment, the control module 14 is configured to receive an attach request of the terminal apparatus 22 and to detect a group information in the attach request which group information is indicative of a respective group of network apparatuses including the network apparatus 12. The group information can be a group-ID which characterizes a certain configuration which can be used for connecting the terminal apparatus 22 to anyone of the network apparatuses of the group. The control module 14 is further configured to compare the detected group-ID with an own group-ID. If the detected group-ID corresponds to the own group-ID, the control module 14 can cause to attach the terminal apparatus 22 with the certain configuration.

Figure 3:
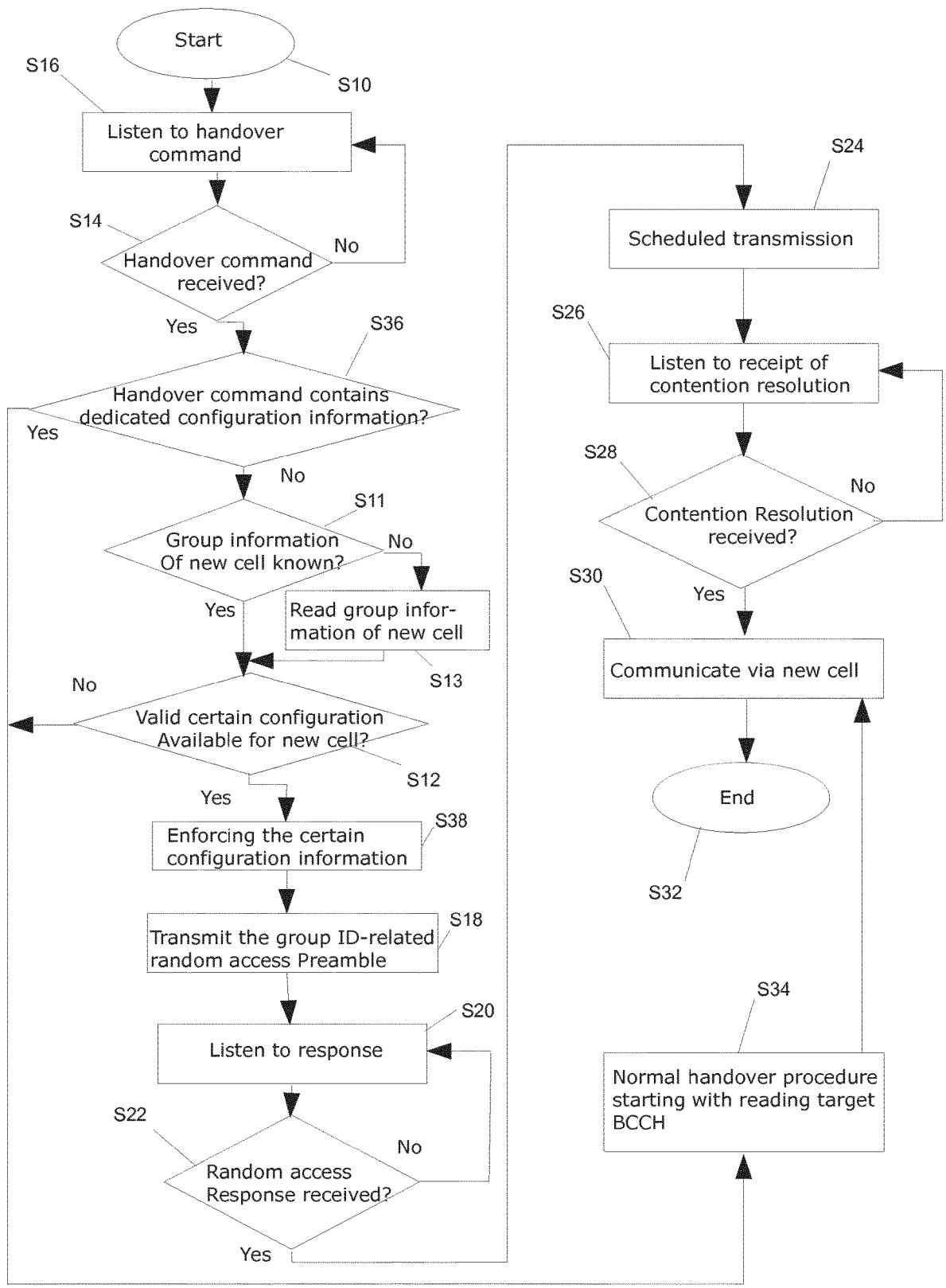
FIG. 3 schematically depicts a flow chart for a handover procedure of a UE according to an exemplary embodiment of the invention.

FIG. 3 shows schematically according to an exemplary embodiment a flow chart of a UE for a handover from a first cell of a wireless communication network to a second cell initiated by the network. The handover condition may be related to poor communication service to the present cell and another cell is in communication range, or the like. If a handover condition may be detected by the network, wherein it is further determined, whether the new cell has the same group-ID as the present first cell. Preferably, the handover command is transmitted to the UE, when the network has determined handover conditions and, moreover, e. g. includes information whether the new cell belongs to the same or other group.

The UE-related process starts at step S10. The process continues at step S16, where the UE listen to a handover command of this cell or network, respectively, to which the UE is attached. Then, it is determined at step S14, whether a handover command from network has been received. If no, the process returns to step S16.

If yes at step S14, the process continues with step S36. At step S36, it is checked if the handover command contains dedicated configuration information to be used for the access to the target side. In this case, the serving network apparatus performs a normal handover at step S34 which preempts the configuration information related to an available group-ID. If no, then the process proceeds with step S11. At step S11, it is checked whether the group information of the new cell is known. If yes, the process continues with step S12. If no, the process proceeds with step S13, where it reads the new cell's group information from the BCCH and continues with S12. At step S12, it is determined whether a valid certain configuration is available in the memory module 30 for the group information of the new cell. If no, the process proceeds at step S34 by providing a normal handover procedure using the existing or current configuration. Then, the process continues at step S30 by communicating via the second cell and ends at step S32.

If the determination at step S12 is yes, the UE has the group-ID and it has the group-ID related valid configuration information needed to establish a connection to the new cell. The process continues at step S38 by enforcing the certain configuration information associated with the group-ID. The process continues at step S18 by transmitting the groupID-related random access Preamble to the new cell.

The process continues at step S20 by listening that can be holding the transceiver 26 in a receiving mode. At step S22, it is determined whether a random access response has been received from the second cell. If not, the process returns to step S20. If yes, the UE provides a scheduled transmission at step S24 and the process continues to step S26 by listening so as to detect receipt of a contention resolution of the second cell. At step S28, it is determined whether the contention resolution of the second cell has been received. If no, the process returns to step S26. If yes, the process continues with step S30 by communicating via the second (new) cell. The process ends at step S32.

According an exemplary embodiment, each, or at least each new, detected group-ID and related certain configuration data may be stored in the memory module 30.

Figure 4:
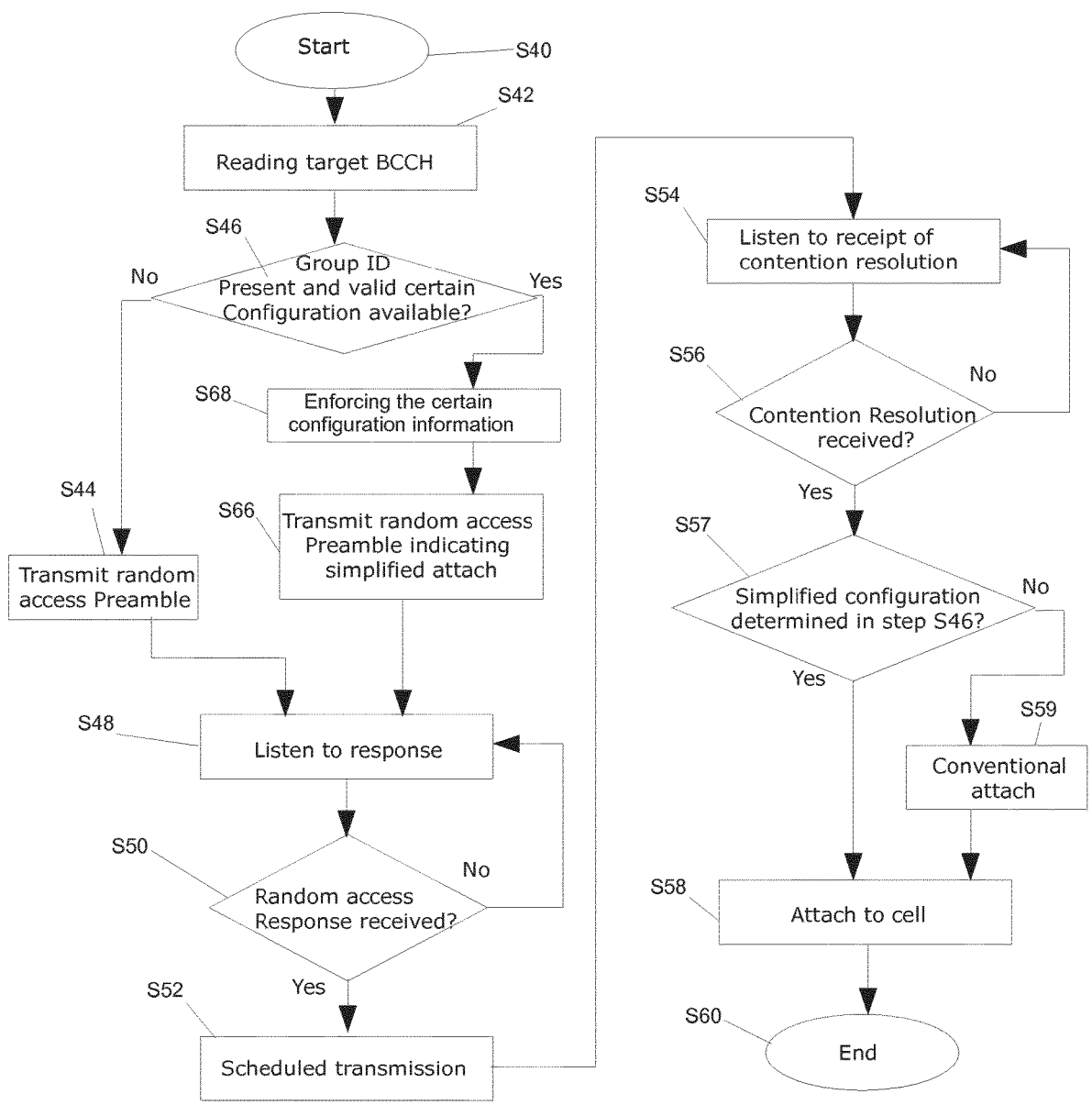
FIG. 4 schematically depicts a flow chart for an attach procedure of a UE according to an exemplary embodiment of the invention.

FIG. 4 shows schematically a flow chart of another exemplary embodiment of the invention related to a UE attach to a cell of a wireless communication network. The process starts at step S40. In step S42, the UE reads the target BCCH of the cell elected to be attached to. At step S46, it is determined whether a group-ID is allocated to the cell and whether a valid related certain configuration is available in memory module 30. If no, the process continues at step S44 by transmitting a random access Preamble as conventional in LTE wireless communication systems. The process continues at step S48. If yes at step S46, the UE proceeds with step S68 by enforcing the certain configuration associated with this group-ID. The process then transmits a random access Preamble indicating simplified attach capability by including the group-ID at step S66. The process continues at step S48, wherein listening to receive a random access response of the cell at step S50. If no, the process returns to step S48. If yes, the UE provides a scheduled transmission at step S52. The process continues at step S54 by listening to receipt of a contention resolution. If no contention resolution is received at step S56, the process return to step S54. If a contention resolution is received at step S56 the process continues with step S57. At step 57 it is checked whether the possibility to attach with simplified certain configuration was determined at step S46. If yes the UE continues at step S58 and proceeds with a simplified attach to the cell by using the certain configuration. If no the UE proceeds at step S59 by proceeding with a conventional attach to the cell. The process ends at step S60.

Figure 5:
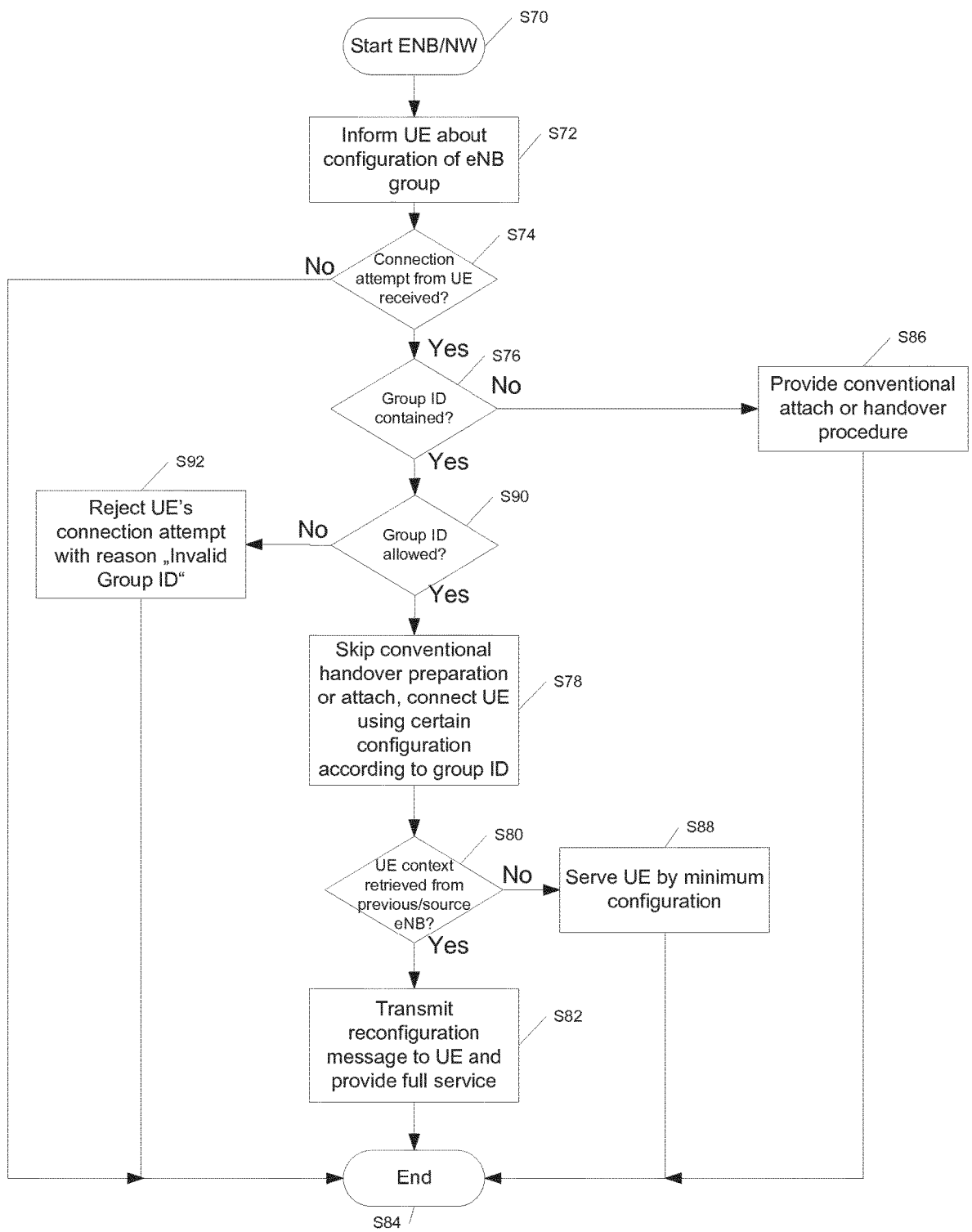
FIG. 5 schematically depicts a flow chart for an attach procedure inside a network element for a UE according to an exemplary embodiment of the invention.

FIG. 5 depicts schematically a flow chart for an attach procedure of a network element such as an eNB according to an exemplary embodiment of the invention to provide for a UE to be attached. The process starts at step S70. At step S72, the UE 20 may be informed about a configuration of a group of eNBs such as the eNB 10 by a group-ID allocated to the group of eNBs that may include the eNB 10 and the certain configuration that is to be used to access eNBs of this group. The group-ID and the related configuration information may be broadcast by one, several or all eNBs of the group so that it can preferably be received from every UE within a communication range with anyone of the eNBs of the group. The group-ID and the related configuration information may also be transmitted from a eNB to the UE via an individual communication channel between the eNB and the UE.

The process continues at step S74, where it is determined whether a connection attempt has been received, e. g. by the transceiver 16 of the eNB 10. If no connection attempt has been received, the process will end at step S84. If yes, it is further determined at step S76, whether a group-ID is contained. If no, the process continues with a normal handover procedure such as e. g. described by the LTE standard. After having finalized this handover procedure, the process ends at step S84.

If the connection attempt contains a group-ID, the process continues at step S90. At step S90 it is checked whether the group-ID received in the connection attempt is valid, i.e. it is a group-ID that is broadcast for the same cell for which the connection attempt has been received in S74. If no, the process continues at step S92 by rejecting the connection attempt, preferable also providing a reason like "Invalid group-ID". If yes at step S90, the process continues at step S78 by skipping the conventional handover procedure and connecting the UE using a certain configuration such as a minimum configuration according to the group-ID.

At step S80, it is determined whether a UE context is received from a previous and/or a source eNB. The context can be received from previous and/or source eNB via the interface 32, such as a S1-interface or a X2-interface allowing a communication link to other eNBs, especially, eNBs of the same group. If no context has been received, the connection maintains at step S88 serving the UE at the certain configuration. The process ends at step S84. If a context has been received at step S80, the process continues by causing the eNB to transmit a reconfiguration message to the UE at step S82 and to provide full service to the UE. The process ends at step S84.

Figure 7:
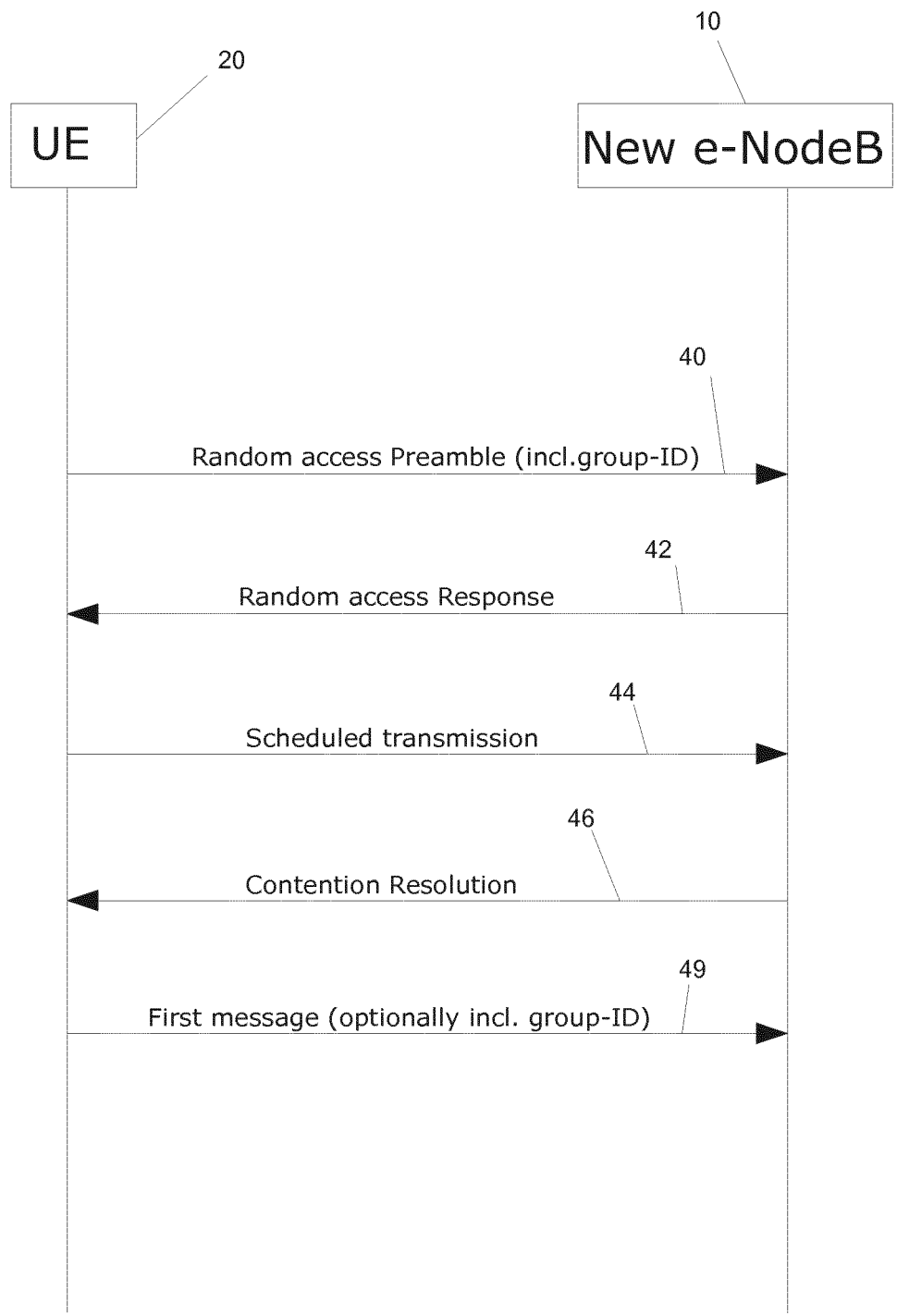
FIG. 7 schematically depicts a signaling diagram for a handover procedure according to an exemplary embodiment of the invention.

In order to avoid the need for the UE to read the target BCCH to get the target cell related RACH configuration in a further exemplary embodiment, the information typically needed, can be pre-known by UE, if the target and serving eNB belong to the same MG-ID. An exemplary embodiment of a contention based RACH procedure is shown in the FIG. 7. FIG. 7 schematically depicts a signaling diagram for such a handover procedure. In an upper portion of FIG. 7 are shown in a horizontal direction a UE such e. g. as the UE 20, and the new eNB, such as the eNB 10 which is allocated to a group of eNBs having the same group-ID. In the vertical direction of FIG. 7, the time is proceeding downwardly.

To ensure that the UE can initiate or execute a valid physical RACH procedure, if the source and target eNBs belong to the same MG-ID, the following RACH information are common for both cells or eNBs, respectively:

1) Same PRACH Preamble Information: Number of RACH preambles, same power ramping parameters, e. g. initial power and power ramping step.

2) Same PRACH Configuration Information: same root sequence index, same PRACH configuration index, same high speed flag, same zero correlation zone configuration and same PRACH frequency offset.

The UE preferably transmits a random access Preamble 40 to the New e-NodeB (eNB). The random access Preamble contains the group-ID (MG-ID) of the mobility group. The eNB receives the random access Preamble and, if it detects that the group-ID identifies the mobility group where the cell belongs to, the eNB transmits a random access Response 42 to the UE. Since this may be a contention-based procedure, the UE provides for scheduled transmission 44 to the eNB. In turn, the eNB transmits a contention resolution 46 to the UE. Then the UE transmits a first message 49 to the eNB. This first message may alternatively contain the MG-ID and/or UE-ID if not already provided by 40 or 44.

Figure 6:
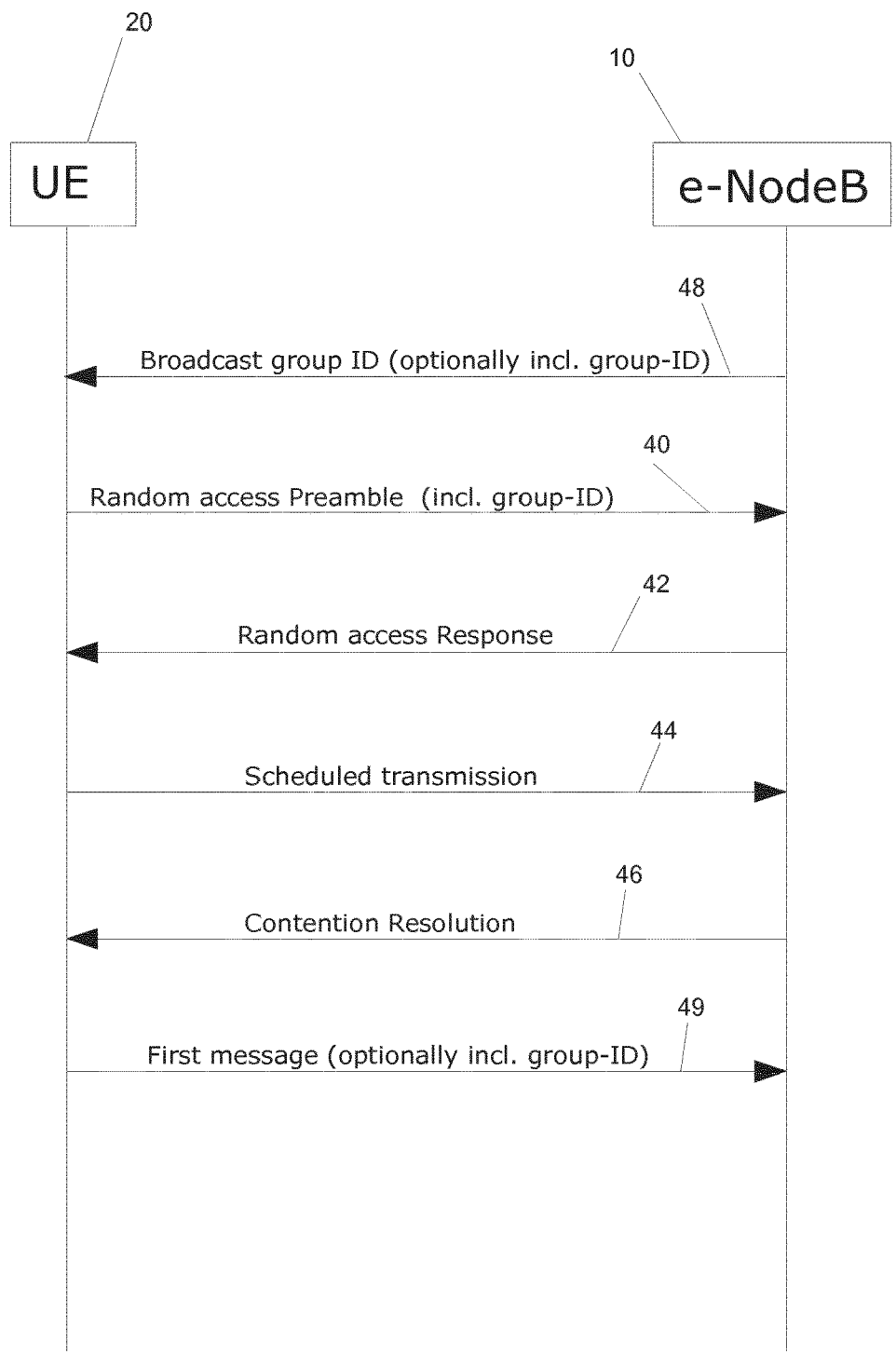
FIG. 6 schematically depicts a signaling diagram for an attach procedure according to an exemplary embodiment of the invention.

FIG. 6 shows an additional exemplary embodiment based on the embodiment of FIG. 7, wherein additionally a signaling is provided. The eNB broadcasts 48 its group-ID so that it can be received from any UE which is in a communication range to receive the broadcast group-ID. The further signaling corresponds to the one as detailed and depicted above in relation to FIG. 7.

However, in this embodiment, the new connection may not yet be able to provide full service to the UE until the eNB is able to optimize the radio link again. This can be achieved by a subsequent re-configuration message adopting the individual UE's capabilities with the individual cell's capabilities. Preferably, this may be possible after the new serving eNB is aware of the full UE context including its capabilities. This context, for example, can be retrieved from the source eNB, or with decreasing reliability from any eNB previously serving this UE.

If a UE context can not be retrieved, the UE may be served within the limits given by a minimum configuration. The same minimal configuration can be administered by Operation Administration Maintenance (OAM) to all the eNBs that are forming the mobility group.

Figure 9:
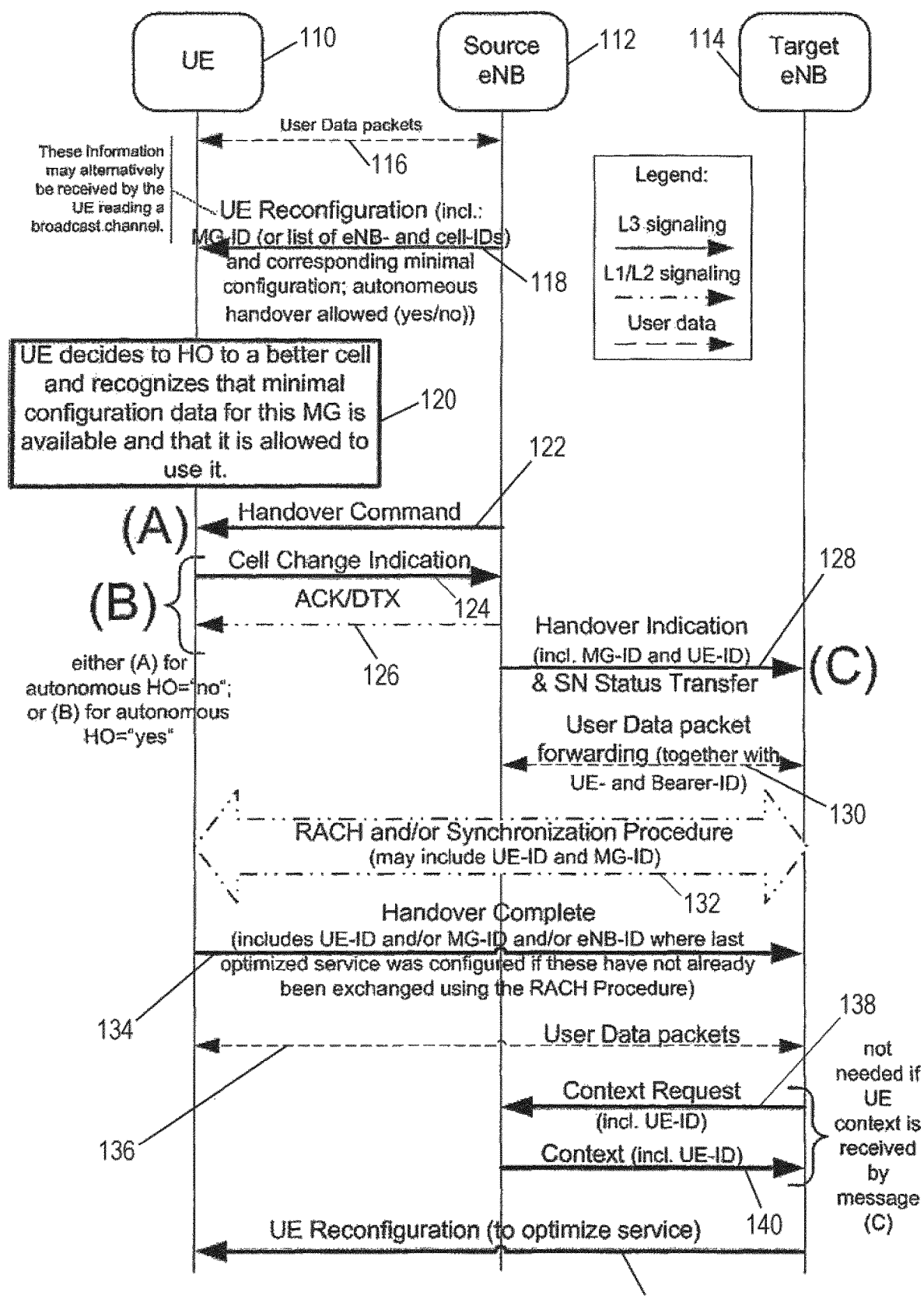
FIG. 9 schematically depicts a message flow chart for a handover procedure of a UE according to an exemplary embodiment of the invention.

FIG. 9 shows a message flow chart for a handover procedure of a UE according to an exemplary embodiment. In the head of FIG. 9, in a horizontal direction are located the UE 110, a source eNB 112 and a target eNB 114. The vertical direction corresponds to the time. The process starts by the UE 110 being connected to the source eNB 112, thereby exchanging user data packets at 116. The source eNB 112 transmits at 118 a UE reconfiguration. The UE reconfiguration includes a mobility group-ID (MG-ID) which may include a list of eNB-IDs and/or cell-IDs. Moreover, a corresponding minimal configuration is included as well as a permission for an autonomous handover.

At 120, the UE 110 decides to handover to a better cell and recognizes that minimal configuration data for this mobility group is available. Moreover, the UE 110 determines that it is allowed to use this data.

If the UE 110 is not allowed to provide an autonomous handover or if the source eNB 112 decides that a handover is needed, the UE receives a handover command 122 from the source eNB 112. If the UE 110 is allowed to provide an autonomous handover, it transmits a cell change indication 124 to the source eNB 112. In response thereto, the eNB 112 transmits an acknowledge/DTX 126.

In both cases, the source eNB 112 transmits a handover indication 128 to the target eNB 114 which preferably includes the MG-ID and a UE-ID. Together therewith, a SN status transfer is provided. This may also include the UE context. In response, user data packet forwarding 130 is provided, preferably including the UE-ID and a bearer-ID.

Next, a RACH and/or synchronization procedure 132 is established between the UE 110 and the target eNB 114. This may include the UE-ID and the MG-ID as well. Then, the UE 110 transmits a handover complete message 134 to the target eNB 114. The handover complete message 134 includes the UE-ID and/or the MG-ID and/or the eNB-ID where last service was configured if this information has not already been exchanged during the RACH procedure. The UE 110 is now linked to the target eNB 114 so that user data packets 136 can be exchanged between the UE 110 and the target eNB 114.

If the UE context is not already received by the target eNB 114, e. g. via the handover indication 128, the target eNB 114 transmits a context request to the source eNB 112 that preferably includes the UE-ID. The source eNB 112 responds with transmission of the respective context 140 preferably also including the UE-ID.

Finally, the target eNB 114 transmits a UE reconfiguration message 142 to the UE 110 so as to optimize the service. The handover is now completed.

In a further exemplary embodiment, a UE entering a mobility group for the first time may have no knowledge about the minimal configuration to be used therein. Preferably, the UE may perform an ordinary/normal handover into the MG, first. Then, the UE can request the specific minimum configuration that can be used by the UE for performing autonomous handovers as long as changing to cells indicating the same broadcast MG-ID.

The UE can also cash information of several group IDs. In order to ensure consistency e. g. when some configurations are to be changed, these configurations can be augmented with a timer indicating the validity time of the configuration so that the UE can maintain the configuration until the timer expires. This Group ID could be a new Information Element (IE) to be implemented or an existing ID could be reused e. g. a Closed Subscriber Group (CSG) ID. In order to still be able to use the CSG ID, some group-IDs can, within their configuration information, also contain the CSG ID to be used. Consequently, the CSG ID may not be the primarily broadcast information of a cell but it may be contained in the configuration data associated with the Group ID.

The UE can also utilize a new Area BCCH, in order to get informed about the minimal configuration to be used. Today the BCCH may only inform about the configuration of the cell transmitting it. According to an exemplary embodiment, this can be enhanced to broadcast the configuration of an entire area. Preferably, the entire configuration of the area can be broadcast by each cell. As typically there will be a large commonality of the configurations, this information can certainly be compressed strongly. For example instead of repeating common configuration of n nodes n times, the common configuration needs to be indicated only once. Parameters that are different can be linked implicitly to an eNB ID, e. g. PCI, in order to ensure e.g. some parameter variability to avoid clashes between configurations of adjacent cells such as e. g. regarding to RACH parameters.

In yet another exemplary embodiment, information can be broadcast about when the adjacent cells transmit their BCCHs to allow the UE to quickly get eNB cell information without much overhead, e. g. when moving to other cells.

Still a further embodiment teaches that adjacent cells may also transmit this Area BCCH, ideally in a staggered way. This allows a UE to get quickly this information, either from its own cell or from an adjacent cell, without having to wait for the transmission period of the Area BCCH within its own cell. This allows transmitting the Area BCCH less often and thus offsetting the increased data volume due to sending configurations of multiple cells. In this way, the net capacity consumed by such an Area BCCH can actually be less than the capacity consumed by an ordinary BCCH. Only the timing information of the BCCH in the current and in adjacent cells, such as e. g. the neighbor cell list, needs to be broadcast more often. Consequently, it only needs to contain information on cells that send the Area BCCH before the current cell, thus the amount of data to be broadcast is getting smaller and smaller, the closer the transmission time of the Area BCCH on the cell gets. On average, slightly less than the Area BCCH transmission timing of half the neighboring cells needs to be broadcast.

According to another exemplary embodiment, the timing can be predetermined by the frame timing, e. g. the Area BCCH is sent whenever the frame number is divisibly by N_BCCH where N_BCCH is a predetermined integer indicating the repetition rate of the Area BCCH for each cell in the entire area.

As a further exemplary enhancement, the Area BCCH can be transmitted in a single frequency network (SFN) fashion e. g. in a kind of predetermined resource jointly by several cells and/or sites. This does not allow reducing the occurrence frequency of the Area BCCH, but the concept of the Area BCCH allows SFN transmission which can be done more reliably in particular at cell edges and thus allows using higher coding rates, i.e. less redundancy, thus freeing capacity.

One exemplary embodiment teaches that not all the information regarding a connection of a UE can be distributed in advance to all potential UEs connecting to a cell, but basically only information that is common to the UEs or at least a group of UEs with similar capabilities or running similar services while some configurations need to be different for different UEs. Such configurations can for example be derived implicitly from a UE ID, e. g. by a Cell Radio Network Temporary Identifier (C-RNTI), International Mobile Subscription Identity (IMSI), International Mobile Equipment Identity (IMEI) or another identity. This can be the case for such parameters that need to be reasonably distributed within a certain range, but not necessarily need to be unique for each UE, e. g. Discontinuous Reception (DRX) muting pattern offsets. For example the parameter to be used by a certain UE could depend on UE-ID modulo 4, this equally distributes the UEs on 4 different sets of parameters.

According to a further exemplary embodiment, the configuration may depend on the UE capabilities. Obviously simple UEs that do not support advanced configurations, such as e. g. multi-Antenna processing, might not be configured to use such an advanced configuration. Such configurations can be made dependent on the UE capability. This can be done implicitly even, i. e. the UE may only consider such configurations that are feasible for it and ignore others, or explicitly, where some configurations are conditional to a certain UE capability. Moreover, these parameters can be negotiated and/or configured during the synchronization procedure, during the call setup, or during handover. In this case a configuration might not be avoided completely but is only necessary for a few specific parameters. Some communication using a minimum configuration may be done already during this negotiation

ADVANTAGES

The advantage of the invention is that a UE can move very quickly and without the need of any handover related control signaling within a mobility group. Especially, no preceding handover preparation is required.

When a UE connected to a first cell connects, e. g. via cell selection or handover, to a second cell of the same group ID, the UE can know essential information of the node and, for instance, can skip reading BCCH information such as for cell reselection, can do a handover without or with less information in the RRC reconfiguration message, or even do a UE initiated handover or a call reestablishment quickly and with less signaling overhead.

Furthermore, the control module is enabled to receive the information earlier, as it can receive from the network apparatus that transmits the information first or can even receive parts in parallel, in particular if the information is transmitted in a staggered way by the different network apparatuses.

By conveying configuration information concerning a group of nodes or cells, respectively, rather than an individual node, the total amount of information that needs to be transferred towards a UE can be reduced considerably. This in turn allows the UE to be prepared for a handover with a multitude of nodes without excessive requirements on transferring or storing associated information.

Moreover, other systems can also benefit from the principles presented herein as long as they have identical or similar properties as the group information usage as detailed herein. Embodiments of the present invention may be implemented in software, hardware, application logic or a combination of software, hardware and application logic. The software, application logic and/or hardware generally reside on control modules of terminal devices or network devices.

In an exemplary embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or a smart phone, a user equipment, or the like.

The present invention can advantageously be implemented in user equipments or smart phones, or personal computers connectable with networks elements such as eNBs, cells, combinations thereof, or the like. That is, it can be implemented as/in chipsets to connected devices, and/or modems thereof. More generally, various systems which allow for a broadcast operation mode, especially, relying on cellular communication, may see performance improvement, especially in view of broadcast message consistency, with the invention being implemented thereto.

If desired, the different functions and embodiments discussed herein may be performed in a different or deviating order and/or concurrently with each other in various ways. Furthermore, if desired, one or more of the above-described functions and/or embodiments may be optional or may be combined, preferably, in an arbitrarily manner.

Although various aspects of the invention are set out in the independent claims, other aspects of the invention comprise other combinations of features from the described embodiments and/or the dependent claims with the features of the independent claims, and not solely the combinations explicitly set out in the claims.

It is also observed herein that, while the above describes exemplary embodiments of the invention, these descriptions should not be regarded as limiting the scope. Rather, there are several variations and modifications which may be made without departing from the scope of the present invention as defined in the appended claims.

LIST OF ACRONYMS

AM Acknowledged Mode
BCCH Broadcast Control Channel
CP Control plane
C-RNTI Cell Radio Network Temporary Identifier
CSG Closed Subscriber Group
DRX Discontinuous Reception
eNB E-UTRAN NodeB
EPC Evolved Packet Core
E-UTRAN Evolved UTRAN
GW Gateway
HeNB Home eNB
ID Identity
IE Information Element
IMEI International Mobile Equipment Identity
IMSI International Mobile Subscription Identity
LTE Long Term Evolution
MBMS Multimedia Broadcast Multicast Service
MBSFN MBMS Single Frequency Network
MG Mobility Group
MG-ID Mobility Group Identification
OAM Operation Administration Maintenance
PDCP Packet Data Convergence Protocol
PRACH Physical Random Access Channel
QoS Quality of Service
RACH Random Access Channel
RAN Radio Access Network
Rel Release
RLC Radio Link Control
RRC Radio Resource Control
S1-3GPP standardized interface between eNB and EPC.
SFN Single Frequency Network
SGW Serving Gateway
SIB System Information Block
UE User Equipment
UP User plane
UTRAN Universal Terrestrial Radio Access Network
X2 3GPP standardized interface between eNBs

The invention claimed is:

1. A terminal apparatus comprising:
   a processor; and
   a memory for storing instructions to be executed by the processor, wherein the processor is configured to:
      listen to a broadcast control channel being transmitted in a staggered manner in a group of cells;
      detect receipt of a group information transmitted in the broadcast control channel indicative of a mobility group of at least two network apparatuses, the group information being transmitted once on the broadcast control channel and being descriptive of configuration parameters that are common in the mobility group of said at least two network apparatuses that enables the terminal apparatus to communicate with any one of the network apparatuses of the respective mobility group;
      detect a handover condition;
      cause, in response to detecting the handover condition, an autonomous handover to one of the at least two network apparatuses by causing to select a network apparatus of the group for establishing a communication link by transmitting an attach request or a message including the group information to the selected network apparatus;
      upon receipt of a response from the one of the at least two network apparatuses, transmit a change message including the group information; and
      request a connection to the selected network apparatus of the mobility group by use of the common configuration.

2. The terminal apparatus according to claim 1, wherein the processor is further configured to:
   request connecting by transmitting an attach request including the group information to any of the at least two network apparatuses by using the common configuration.

3. The terminal apparatus according to claim 1, wherein the processor is further configured to:
   request connecting by transmitting a message including the group information upon receipt of a response of a respective network apparatus.

4. The terminal apparatus according to claim 1, wherein the processor is further configured to:
   cause the change message to include individual configuration information of the terminal apparatus.

5. The terminal apparatus according to claim 1, wherein the processor is further configured to:
   cause receipt of the group information via an individual message channel allocated to the terminal.

6. The terminal apparatus according to claim 1, wherein the processor is further configured to:
   cause reconfiguration of terminal-related communication parameters upon receipt of a reconfiguration message from the network apparatus.

7. A method for operating a terminal apparatus, comprising:
- listening to a broadcast control channel being transmitted in a staggered manner in a group of cells;
- detecting receipt of a group information transmitted in the broadcast control channel indicative of a mobility group of at least two network apparatuses, the group information being transmitted once on the broadcast control channel and being descriptive of configuration parameters that are common in the mobility group of said at least two network apparatuses that enables the terminal apparatus to communicate with any one of the network apparatuses of the respective mobility group;
- detecting a handover condition;
- causing, in response to detecting the handover condition, an autonomous handover to one of the at least two network apparatuses by causing to select a network apparatus of the group for establishing a communication link by transmitting an attach request or a message including the group information to the selected network apparatus;
- upon receipt of a response from the one of the at least two network apparatuses, transmitting a change message including the group information; and
- requesting a connection to the selected network apparatus of the mobility group by use of the common configuration.

8. The method according to claim 7, further comprising:
requesting connecting by transmitting an attach request including the group information to any of the at least two network apparatuses by using the common configuration.

9. The method according to claim 7, further comprising:
requesting connecting by transmitting a message including the group information upon receipt of a response of a respective network apparatus.

10. The method according to claim 7, further comprising:
causing the change message to include individual configuration information of the terminal apparatus.

11. The method according to claim 7, further comprising:
causing receipt of the group information via an individual message channel allocated to the terminal.

12. The method according to claim 7, further comprising:
causing reconfiguration of terminal-related communication parameters upon receipt of a reconfiguration message from the network apparatus.

* * * * *